US008739638B1

(12) United States Patent
England et al.

(10) Patent No.: US 8,739,638 B1
(45) Date of Patent: Jun. 3, 2014

(54) STAR-SHAPED FLUID FLOW TOOL FOR USE IN MAKING DIFFERENTIAL MEASUREMENTS

(75) Inventors: John Dwight England, Arab, AL (US); Anthony R. Kelley, Sommerville, AL (US); Raymond J. Cronise, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 373 days.

(21) Appl. No.: 13/302,817

(22) Filed: Nov. 22, 2011

(51) Int. Cl.
G01F 1/46 (2006.01)
G01F 1/37 (2006.01)

(52) U.S. Cl.
USPC ..................................... 73/861.65; 73/861.52

(58) Field of Classification Search
None
See application file for complete search history.

(56) References Cited

U.S. PATENT DOCUMENTS

| 3,034,353 | A | * | 5/1962 | Anderson | 73/861.65 |
|---|---|---|---|---|---|
| 3,558,162 | A | | 1/1971 | Ferrai et al. | |
| 3,910,113 | A | * | 10/1975 | Brown | 73/861.65 |
| 4,290,314 | A | * | 9/1981 | Geronime | 73/861.52 |
| 4,823,615 | A | | 4/1989 | Taha | |
| 4,968,066 | A | | 11/1990 | Adams | |
| 5,086,655 | A | * | 2/1992 | Fredericks et al. | 73/861.61 |
| 5,612,499 | A | | 3/1997 | Andrew et al. | |
| 5,853,030 | A | | 12/1998 | Walding | |
| 5,971,001 | A | | 10/1999 | Andersson | |
| 6,311,568 | B1 | * | 11/2001 | Kleven | 73/861.42 |
| 6,543,297 | B1 | * | 4/2003 | Kleven | 73/861.52 |
| 6,622,573 | B2 | * | 9/2003 | Kleven | 73/861.42 |
| 6,725,731 | B2 | * | 4/2004 | Wiklund et al. | 73/861.52 |
| 6,865,957 | B1 | * | 3/2005 | Hughes et al. | 73/861.52 |
| 7,001,106 | B2 | | 2/2006 | Burnham et al. | |
| 7,070,209 | B2 | | 7/2006 | Collins | |
| 7,284,450 | B2 | * | 10/2007 | Orleskie et al. | 73/861.52 |
| 7,404,337 | B2 | * | 7/2008 | Hughes et al. | 73/861.52 |
| 7,406,880 | B2 | * | 8/2008 | Orleskie et al. | 73/861.65 |
| 7,497,772 | B2 | | 3/2009 | Laib | |
| 7,674,072 | B2 | | 3/2010 | Shook et al. | |
| 7,681,461 | B2 | | 3/2010 | Rosenbaum et al. | |
| 7,735,381 | B2 | | 6/2010 | Lodolo | |
| 8,522,625 | B2 | * | 9/2013 | Philipps | 73/861.52 |
| 2002/0040607 | A1 | * | 4/2002 | Kleven | 73/861.52 |
| 2008/0307896 | A1 | * | 12/2008 | Ifft et al. | 73/861.61 |

FOREIGN PATENT DOCUMENTS

EP 0249362 A1 12/1987

* cited by examiner

*Primary Examiner* — Harshad R Patel
(74) *Attorney, Agent, or Firm* — Peter J. Van Bergen; James J. McGroary

(57) ABSTRACT

A fluid flow tool's plate-like structure has a ring portion defining a flow hole, a support portion extending radially away from the ring portion and adapted to be coupled to conduit wall, and extensions extending radially away from the ring portion such that a periphery of the plate-like structure is defined by the extensions and trough regions between adjacent extensions. One or more ports formed in the ring portion are in fluid communication with the flow hole. A first manifold in the plate-like structure is in fluid communication with each port communicating with the flow hole. One or more ports are formed in the periphery of the plate-like structure. A second manifold in the plate-like structure is in fluid communication with each port formed in the periphery. The first and second manifolds extend through the plate-like structure to terminate and be accessible at the conduit wall.

22 Claims, 3 Drawing Sheets

STAR-SHAPED FLUID FLOW TOOL FOR USE IN MAKING DIFFERENTIAL MEASUREMENTS

ORIGIN OF THE INVENTION

The invention described herein was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to flow measurement tools. More specifically, the invention is a star-shaped device that, when placed in a conduit, can be used in making differential measurements in a flow.

2. Description of the Related Art

For a variety of reasons, devices are needed that can be adapted to an existing fluid conduit for the temporary or permanent provision of specific functions. One such function is the measurement of a parameter of a flowing fluid. Other functions include mixing the flowing fluid and/or injecting a second fluid into the (main) flowing fluid. With respect to parameter measurement, attributes of interest include pressure, velocity, density, temperature, etc. Currently, many flow "measurement" devices collect flow information that is then used in some approximation or modeling scheme to estimate flow attributes. In addition, current flow measurement devices are installed by cutting fully through existing conduits and then "splicing" the flow measurement devices into the conduit. This can be time consuming, tedious, and costly. This is especially problematic when making differential measurements (i.e., at two spaced apart locations along a conduit) as multiple devices must be spliced into a conduit with the entire installation then requiring calibration to account for installation irregularities. Still further, current differential flow measurement devices can create substantial pressure losses effecting pump efficiency. Flow measurement devices can also be the source of a blockage in a conduit when solids and/or foreign matter are present in a flowing fluid (e.g., man-made debris, natural debris such as hair, sticks, leaves, etc.). For example, a flow measurement device such as an orifice plate is readily clogged with debris thereby impacting flow measurements and the flow itself.

SUMMARY OF THE INVENTION

Accordingly, it is an object of the present invention to provide a fluid flow tool that can be used when making differential measurements in a flowing fluid.

Another object of the present invention is to provide a fluid flow tool that can be readily installed in an existing conduit in preparation for making differential measurements of a fluid flow moving through the conduit.

Still another object of the present invention is to provide a flowing-fluid differential measurement-supporting tool that is resistant to clogging.

Other objects and advantages of the present invention will become more obvious hereinafter in the specification and drawings.

In accordance with the present invention, a fluid flow tool is provided for use in making differential measurements of flow attributes. The tool is a plate-like structure having a ring portion defining a flow hole therethrough, a support portion coupled to and extending radially away from the ring portion and adapted to be coupled to an exterior wall of a conduit, and a plurality of extensions coupled to and extending radially away from the ring portion. The extensions are distributed about the ring portion in a spaced apart fashion such that a periphery of the plate-like structure is defined by the extensions and trough regions formed at the ring portion between adjacent extensions. At least one measurement port is formed in the ring portion and is in fluid communication with the flow hole. A first manifold is formed in the plate-like structure and is in fluid communication with each measurement port communicating with the flow hole. The first manifold extends through the plate-like structure to terminate and be accessible at the exterior wall of the conduit. At least one measurement port is formed in the periphery of the plate-like structure. A second manifold is formed in the plate-like structure and is in fluid communication with each measurement port formed in the periphery. The second manifold extends through the plate-like structure to terminate and be accessible at the exterior wall of the conduit.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
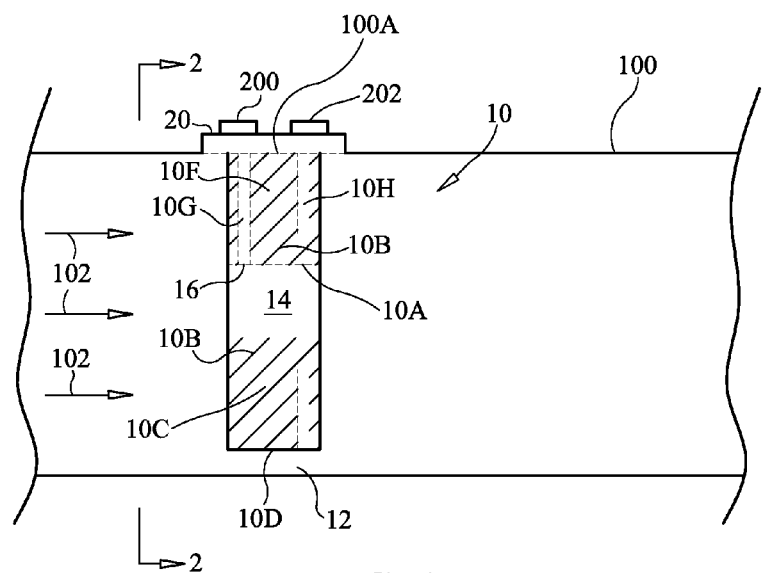
FIG. 1 is a cross-sectional view of a fluid flow tool used to facilitate differential measurements in accordance with an embodiment of the present invention.

Referring now to the drawings, simultaneous reference will be made to FIGS. 1 and 2 where cross-sectional and head-on views, respectively, of a fluid flow tool used to facilitate the collection of differential measurements in a fluid flow in accordance with an embodiment of the present invention is shown and is referenced generally by numeral 10. Tool 10 is positioned/mounted in a conduit 100 that carries a flowing fluid moving in a known direction where such fluid and its flow direction are indicated by arrows 102. The terms "upstream" and "downstream" as used herein are referenced to the flow direction of fluid flow 102. Fluid flow 102 can be a gas, vapor, a pure liquid, or a gas or liquid mixed with some solids that are present by design or by circumstance. For example, fluid flow 102 could contain natural or man-made debris that must pass through conduit 100 and past device 10 to maintain flow efficiency.

In general, tool 10 is a self-contained device that positions measurement ports in fluid flow 102 in a pre-determined and definitive manner such that differential measurements concerning flow 102 can be made easily and precisely. Tool 10 is plate-like in structure with a hole 10A formed centrally therethrough and a solid ring portion 10B defined around hole 10A. A number of spaced-apart fingers or extensions 10C extend radially away from solid ring portion 10B with the tips 10D of extension 10C being spaced apart from the interior wall of conduit 100. Troughs 10E are formed at ring portion 10B between adjacent ones of extensions 10C. Tool 10 also includes a support arm 10F coupled to ring portion 10B. As will be explained later below, support arm 10F is coupled to conduit 100 in order to position tool 10 in fluid flow 102. Generally, support arm 10F positions tool 10 in conduit 100 such that hole 10A is aligned centrally in conduit 100 as illustrated. As a result of this construction and positioning, a flow region 12 is defined about the periphery of tool 10 and a flow region 14 is defined by hole 10A.

Measurement ports are provided in tool 10 to facilitate differential measurements concerning fluid flow 102. For example, measurement ports can be located in tool 10 where fluid flow 102 reacts differently as it moves past/through tool 10 so that tool 10 with its measurement ports creates a differential measurement environment. Measurement ports can also be located at various upstream and downstream locations on tool 10.

The above-described elements of tool 10 can be separate elements coupled to one another or they can be formed as an integrated device (e.g., molded as one piece). In either case, tool 10 can be installed as part of conduit 100 or can be installed in an existing conduit 100. In terms of an existing conduit 100, an installation/entry aperture (indicated by dashed line 100A) is cut in conduit 100. Aperture 100A is sized/shaped to receive tool 10 therethrough. Since tool 10 is a plate-like structure, aperture 100A need only be a single slot cut partially into conduit 100. Once positioned in conduit 100, tool 10 is coupled and sealed to conduit 100 by means of a mounting/sealing arrangement 20, the design of which is not a limitation of the present invention. Since conduit 100 need only have a simple aperture/slot 100A cut therein, the overall integrity, shape, and size of conduit 100 is maintained such that tool 10 has little or no impact on the existing system.

Figure 2:
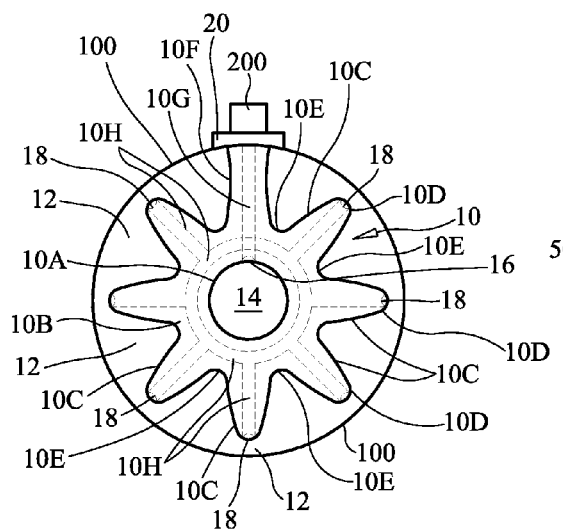
FIG. 2 is a head-on view of the fluid flow tool taken from an upstream location indicated by line 2-2 in FIG. 1.
Figure 3:
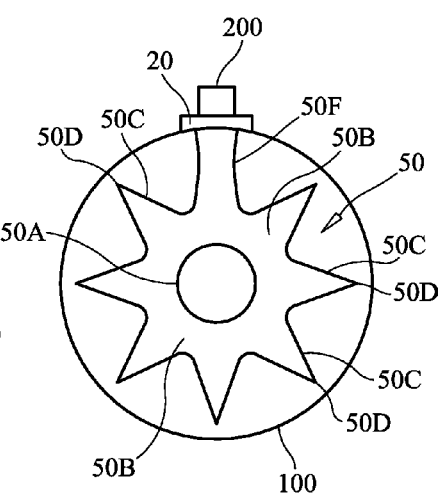
FIG. 3 is a head-on view of a fluid flow tool having pointed extensions in accordance with another embodiment of the present invention.

In the embodiment illustrated in FIG. 2, extensions 10C have rounded tips 10D. However, the number, shape, length and/or length uniformity of extensions 10C are not limitations of the present invention. For example, in FIG. 3, a tool 50 has a central hole 50A with a solid ring portion 50B defined around hole 50A. Tool 50 is supported in conduit 100 by a support arm 50F held/sealed in place by mounting/sealing arrangement 20. However, in this embodiment, spaced-apart and radially-extending extensions 50C are triangular in shape such that the tips 50D thereof are pointed. That is, tool 50 is a star polygon shaped plate with a hole 50A passing centrally therethrough. For simplicity of illustration, no measurement ports are shown in FIG. 3. Another embodiment/application of the present invention could utilize extensions whose lengths are selected such that the extension tips contact the interior wall of a conduit thereby centering the tool in the conduit and/or serving as a gauge that provides an indication as to conduit symmetry or a tool that forced conduit symmetry where it is installed.

Figure 4:
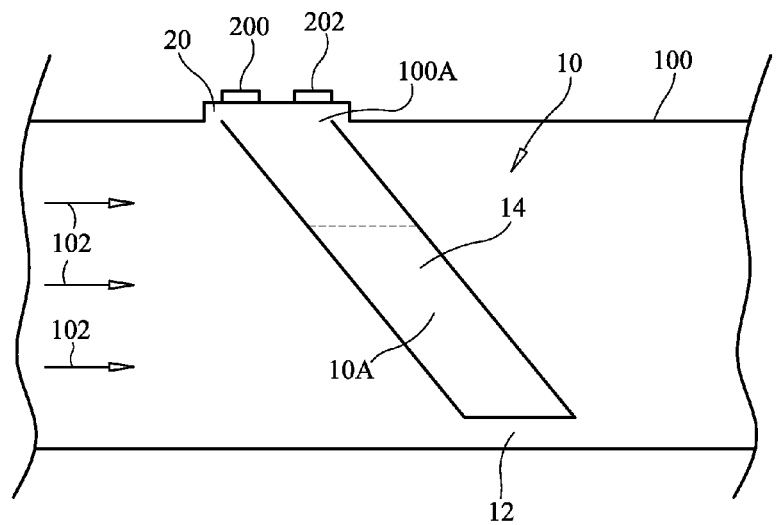
FIG. 4 is a side view of a fluid flow tool installed in a conduit such that it forms a non-perpendicular angle with respect to the direction of an oncoming fluid flow in accordance with another embodiment of the present invention.

Tool 10 illustrated in FIG. 2 is positioned such that its face is perpendicular to fluid flow 102. However, the present invention is not so limited. For example, FIG. 4 illustrates tool 10 positioned in conduit 100 such that the face of tool 10 forms a non-perpendicular angle with respect to the direction of fluid flow 102 impinging thereon. As will be explained further below, this non-perpendicular positioning of tool 10 can be used to facilitate upstream/downstream differential measurements of fluid flow 102. Furthermore, such non-perpendicular positioning of tool 10 reduces or eliminates collection of solids/debris (that might be present in fluid flow 102) on tool 10 as fluid flow 102 passes thereby.

For simplicity of illustration, the face of the tool in the various embodiments present herein is illustrated as flat. However, the present invention is not so limited as the face of the tool can be curved or otherwise shaped to satisfy flow requirements and/or minimize clogging. Such curving/shaping of the tool can be applied to both perpendicular and non-perpendicular positioning embodiments of the tool.

As mentioned above, one or more measurement ports are provided in tool 10 at locations that facilitate differential measurements associated with fluid flow 102. A variety of measurement port placements can be utilized without departing from the present invention. By way of illustrative examples, several port placements will be discussed and illustrated herein. However it is to be understood the present invention is not limited to these examples.

Referring first to the embodiment illustrated in FIGS. 1 and 2, tool 10 creates a differential measurement environment between flow regions 12 and 14. More specifically, measurement port 16 is provided in tool 10 at hole 10A such that port 16 communicates with flow region 14. Measurement ports 18 are also provided in tool 10 at tips 10D of extensions 100 such that each port 18 communicates with flow region 12. By placing a measurement port 18 at each extension 100, average values for attributes of fluid flow 102 in flow region 12 can be readily generated. However, it is to be understood that measurement ports can be placed at one or more of the extensions without departing from the scope of the present invention.

Measurement port 16 is fluidly coupled to a sensor 200 outside of conduit 100 by a manifold 10G formed in tool 10. Similarly, measurement ports 18 are fluidly coupled to a sensor 202 outside of conduit 100 by a common manifold 10H in tool 10. Sensors 200 and 202 are used to collect information concerning fluid flow 102 in flow regions 12 and 14, respectively. Each of sensors 200 and 202 can be a pressure sensor, strain gauge, fiber optic sensor, etc., and can be used in conjunction with a temperature sensor.

Figure 5:
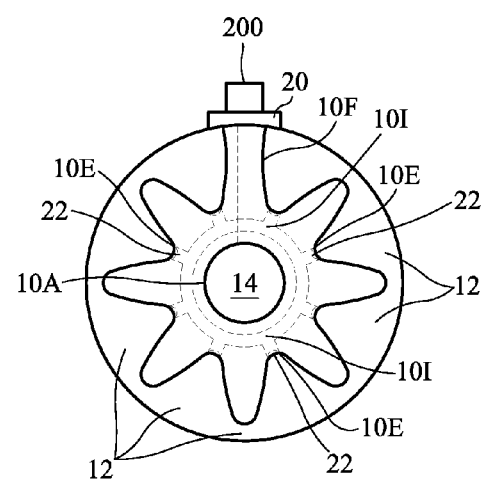
FIG. 5 is a head-on view of a fluid flow tool ported at its troughs in accordance with another embodiment of the present invention.

Referring next to the embodiment illustrated in FIG. 5, a differential measurement environment is again created between flow regions 12 and 14. However, in this example, a measurement port 22 is provided in each trough 10E. Ports 22 are fluidly coupled to a sensor (not visible in FIG. 3) outside of conduit 100 by a common manifold 10I formed in tool 10. Similar to the ports in the extensions, it is to be understood that measurement ports can be placed at one or more of the troughs without departing from the scope of the present invention.

The non-perpendicular positioning of tool 10 illustrated in FIG. 4 is clog-resistant and can be used to provide upstream/downstream differential measurements. For example, ports (not shown) in the upstream portion of tool 10 could be fluidly coupled (via manifolds not illustrated in FIG. 4 to maintain clarity of illustration) to one sensor (e.g., sensor 200) while ports in the downstream portion of tool 10 could be fluidly coupled to a separate sensor (e.g., sensor 202). As in the previous embodiments, the sensors could be located outside of conduit 100.

Figure 6:
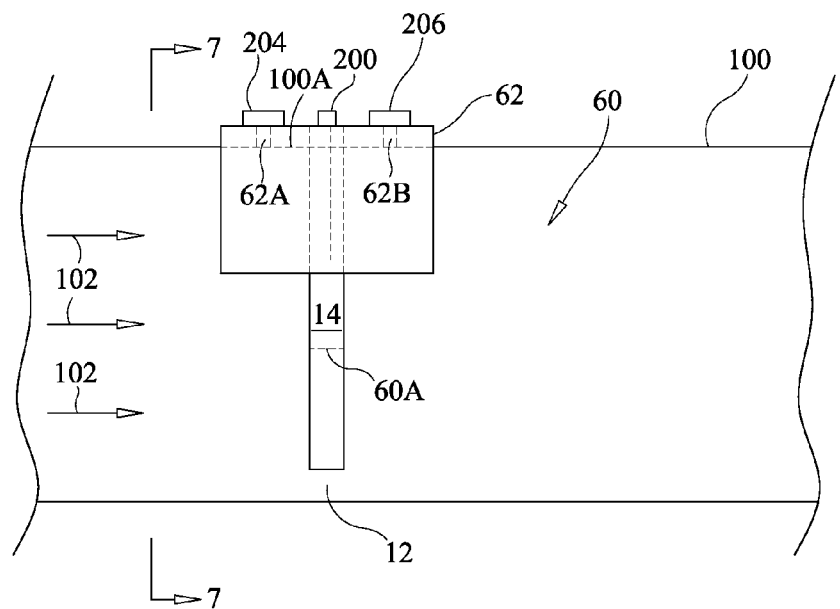
FIG. 6 is a side view of an integrated fluid flow tool in accordance with another embodiment of the present invention.
Figure 7:
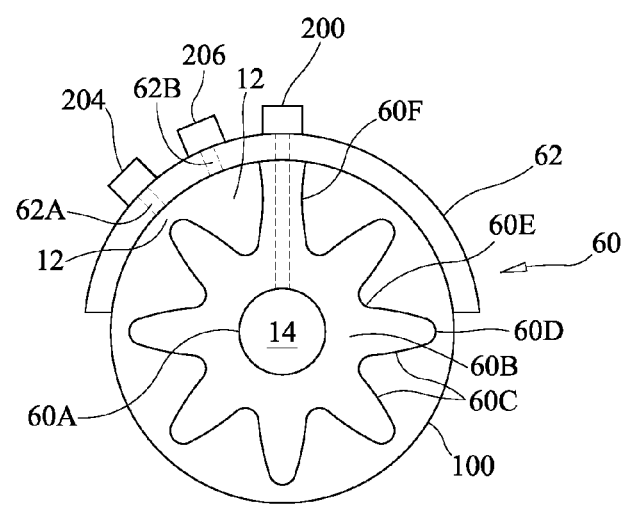
FIG. 7 is a head-on view of the fluid flow tool taken from an upstream location indicated by line 7-7 in FIG. 5.

As mentioned above, the fluid flow tool of the present invention can be constructed as an integrated device. Accordingly, another embodiment of the present invention is illustrated in FIGS. 6 and 7 where an integrated fluid flow tool is referenced generally by numeral 60. The elements of tool 60 that are common with those of the previously-described tool 10 are referenced using the same lettering scheme. In this embodiment, tool 60 also includes the mounting structure that couples tool 60 to conduit 100. More specifically, tool 60 has a curved mounting plate 62 integrated with the tool's support arm 60F. Plate 62 is larger than the size of aperture 100A so that mounting plate 62 rests on conduit 100 as the remaining portions of tool 60 are suspended within conduit 100 as previously described. The sealing and coupling of plate 62 to conduit 100 can be accomplished in a variety of ways without departing from the scope of the present invention. The relative thickness of plate 62 is exaggerated in FIG. 6 for clarity of illustration.

Mounting plate 62 can incorporate one or more measurement ports/manifolds positioned so that measurements of attributes of fluid flow 102 can be collected just upstream and/or downstream of the portions of tool 60 residing within conduit 100. For example, in the illustrated embodiment, an upstream measurement port/manifold 62A and a downstream measurement port/manifold 62B are formed through plate 62. Each port/manifold 62A and 62B is fluidly coupled to a separate sensor 204 and 206, respectively. It is to be understood that the number and location of ports in plate 62 can be varied from the illustrated embodiment without departing from the scope of the present invention. Separate sensors 204 and 206 are positioned outside of conduit 100. Each sensor is used to collect flow information concerning fluid flow 102 in different upstream or downstream portions of flow region 12. Similar to the previously-described sensors 200 and 202, each of sensors 204 and 206 can be a pressure sensor, strain gauge, fiber optic sensor, etc., and can be used in conjunction with a temperature sensor.

In addition to the features described above, each configuration of the present invention's fluid flow tool can have its outer edges of the extensions, troughs, and/or central flow hole, modified to satisfy flow requirements. For example, the outer edges on the upstream and downstream faces of the fluid flow tool could be tapered or rounded per flow requirements or to reduce drag forces and pressure loss in the fluid flow.

The advantages of the present invention are numerous. The self-contained fluid flow tool will provide for multiple differential measurements in a fluid flow. The tool is easily installed in existing conduits and does not disturb the basic conduit installation or structural integrity. The tool's measurements ports are fixed/known 'a priori' thereby eliminating the need for calibration at each installation. The tool can be positioned to greatly reduce or eliminate the possibility of being clogged with foreign matter and debris and will, therefore, require little or no maintenance and will not impact flow/pump efficiencies. The shape of the tool can also facilitate flow conditioning. For example, the distributed extensions can be used to induce uniform flow distribution in the conduit where such nominal flow conditions may not exist. The multiple differential measurement locations enable flow cross-checking to evaluate proper instrumentation function and to calculate flowing fluid properties such as density, viscosity, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A fluid flow tool for use in making differential measurements of flow attributes, comprising:
    a plate shaped structure having a ring portion defining a flow hole therethrough,
    a support portion coupled to and extending radially away from said ring portion and adapted to be coupled to an exterior wall of a conduit, and
    a plurality of extensions coupled to and extending radially away from said ring portion, said extensions being distributed about said ring portion in a spaced apart fashion wherein a periphery of said plate shaped structure is defined by said extensions and trough regions formed at said ring portion between adjacent ones of said extensions;
    at least one measurement port formed in said ring portion and in fluid communication with said flow hole;
    a first manifold formed in said plate shaped structure and in fluid communication with said at least one measurement port so-communicating with said flow hole, said first manifold extending through said plate shaped structure to terminate and be accessible at the exterior wall of the conduit;
    at least one measurement port formed in said periphery of said plate shaped structure; and
    a second manifold formed in said plate shaped structure and in fluid communication with said at least one measurement port so-formed in said periphery, said second manifold extending through said plate shaped structure to terminate and be accessible at the exterior wall of the conduit.

2. A fluid flow tool as in claim 1, wherein each of said extensions comprises a triangle shape with a base of said triangle shape coupled to said ring portion.

3. A fluid flow tool as in claim 1, wherein said at least one measurement port so-formed in said periphery comprises a plurality of measurement ports distributed in the extensions about said periphery.

4. A fluid flow tool as in claim 1, wherein said at least one measurement port so-formed in said periphery comprises a plurality of measurement ports in said periphery distributed in said trough regions.

5. A fluid flow tool as in claim 3, wherein each of said plurality of measurement ports in said periphery is formed in a tip of one of said extensions.

6. A fluid flow tool as in claim 1, wherein said support portion and said plurality of extensions positions said flow hole at a central portion of the conduit.

7. A fluid flow tool as in claim 1, further comprising:
    a measurement port formed in said support portion and adapted to be in fluid communication with an interior region of the conduit; and
    a third manifold formed in said support portion and in fluid communication with said measurement port so-formed in said support portion, said third manifold extending through said support portion to terminate and be accessible at the exterior wall of the conduit.

8. A fluid flow tool for use in making differential measurements of attributes of a fluid moving in a flow direction through a conduit, comprising:
    a star polygon shaped plate having a hole formed through a central portion thereof;

a support arm having a first end and a second end, said first end adapted to be coupled to an exterior wall of a conduit, said second end coupled to said plate wherein said support arm is adapted to position said plate centrally in the conduit wherein a first flow region is defined around said plate and a second flow region is defined by said hole in said plate;

at least one measurement port formed in said plate and in fluid communication with said first flow region;

a first manifold formed in said plate and in fluid communication with said at least one measurement port so-communicating with said first flow region, said first manifold terminating and accessible at the exterior wall of the conduit;

at least one measurement port formed in said plate and in fluid communication with said second flow region; and at least one second manifold formed in said plate and in fluid communication with said at least one measurement port so-communicating with said second flow region, each said second manifold terminating and accessible at the exterior wall of the conduit.

9. A fluid flow tool as in claim 8, wherein a face of said plate is adapted to be perpendicular to the flow direction.

10. A fluid flow tool as in claim 8, wherein a face of said plate is adapted to be non-perpendicular to the flow direction.

11. A fluid flow tool as in claim 8, wherein said at least one measurement port so-communicating with said first flow region comprises a plurality of measurement ports distributed about a periphery of said plate.

12. A fluid flow tool as in claim 8, further comprising:

a mounting plate adapted to be supported in an aperture of the conduit wherein said support arm is coupled to said mounting plate; and at least one measurement port formed through said mounting plate and adapted to be in fluid communication with an interior region of the conduit.

13. A fluid flow tool as in claim 12, wherein said at least one measurement port so-formed through said mounting plate comprises a plurality of measurement ports.

14. A fluid flow tool as in claim 12, wherein said at least one measurement port so-formed through said mounting plate is upstream of said star polygon shaped plate.

15. A fluid flow tool as in claim 12, wherein said at least one measurement port so-formed through said mounting plate is downstream of said star polygon shaped plate.

16. A fluid flow tool for use in making differential measurements of attributes of a fluid moving in a flow direction through a conduit, said fluid flow tool comprising an integrated device adapted to be partially inserted through an aperture formed in an exterior wall of a conduit, adapted to be suspended from and sealed to the exterior wall at the aperture, and adapted to partially reside in the conduit, said integrated device including a star-shaped plate having a hole formed through a central portion thereof, said plate adapted to pass through the aperture, a support arm adapted to pass through the aperture, said support arm having a first end and a second end, said first end coupled to said plate wherein said support arm positions said plate centrally in the conduit wherein a first flow region is defined around said plate and a second flow region is defined by said hole in said plate, a mounting plate coupled to said support arm at said second end thereof, said mounting plate adapted to be coupled to the conduit while covering the aperture of the conduit, at least one measurement port formed through said mounting plate and in fluid communication with said second flow region, at least one measurement port formed in said star-shaped plate and in fluid communication with one of said first flow region and said second flow region, and at least one manifold formed in said star-shaped plate and in fluid communication with said at least one measurement port so-formed in said star-shaped plate, said at least one manifold extending through said support arm to terminate and be accessible at the exterior wall of the conduit.

17. A fluid flow tool as in claim 16, wherein a face of said star-shaped plate is adapted to be perpendicular to the flow direction.

18. A fluid flow tool as in claim 16, wherein a face of said star-shaped plate is adapted to be non-perpendicular to the flow direction.

19. A fluid flow tool as in claim 16, wherein said at least one measurement port so-formed in said star-shaped plate and so-communicating with said first flow region comprises a plurality of measurement ports distributed about a periphery of said star-shaped plate.

20. A fluid flow tool as in claim 16, wherein said at least one measurement port so-formed through said mounting plate comprises a plurality of measurement ports.

21. A fluid flow tool as in claim 16, wherein said at least one measurement port so-formed through said mounting plate is upstream of said star-shaped plate.

22. A fluid flow tool as in claim 16, wherein said at least one measurement port so-formed through said mounting plate is downstream of said star-shaped plate.

* * * * *